(12) United States Patent
Schulte et al.

(10) Patent No.: US 7,817,205 B2
(45) Date of Patent: Oct. 19, 2010

(54) CAMERA ARRAY AND METHOD FOR ADJUSTING A LENS WITH RESPECT TO THE IMAGE SENSOR

(75) Inventors: Michael Schulte, Paderborn (DE); Michael Makaruk, Stuttgart (DE); Markus Adameck, Lippstadt (DE)

(73) Assignee: Hella KGaA, Lippstadt (DE)

(*) Notice: Subject to any disclaimer, the term of this patent is extended or adjusted under 35 U.S.C. 154(b) by 876 days.

(21) Appl. No.: 10/583,396

(22) PCT Filed: Dec. 15, 2004

(86) PCT No.: PCT/EP2004/014285
§ 371 (c)(1),
(2), (4) Date: Mar. 26, 2007

(87) PCT Pub. No.: WO2005/060240
PCT Pub. Date: Jun. 30, 2005

(65) Prior Publication Data
US 2007/0189765 A1    Aug. 16, 2007

(30) Foreign Application Priority Data
Dec. 17, 2003   (DE) ................. 103 59 193

(51) Int. Cl.
*H04N 5/225* (2006.01)
(52) U.S. Cl. .................. 348/360; 348/340; 348/335
(58) Field of Classification Search .......... 348/335–361
See application file for complete search history.

(56) References Cited
U.S. PATENT DOCUMENTS

| | | |
|---|---|---|
| 4,185,903 A | 1/1980 | Land |
| 5,129,717 A | 7/1992 | Feinbloom et al. |
| 5,467,228 A | 11/1995 | Lin et al. |
| 2007/0024740 A1* | 2/2007 | Strong .................. 348/360 |
| 2007/0132878 A1* | 6/2007 | Tanaka .................. 348/360 |

(Continued)

FOREIGN PATENT DOCUMENTS

DE     2443 441 B1     9/1974

(Continued)

OTHER PUBLICATIONS

International Search Report for PCT/EP2004/014285—Publication date Dec. 15, 2004.

(Continued)

*Primary Examiner*—Tuan Ho
(74) *Attorney, Agent, or Firm*—Robert C. Haldiman; Husch Blackwell LLP

(57) ABSTRACT

Camera arrangement, in particular for use in a motor vehicle, including a printed circuit board with an image sensor and an objective lens carrier, and an objective lens for projecting an image onto the image sensor, the objective lens being connected by connecting means to the objective lens carrier, the connecting means being one or more ball segment-shaped housing sections which are provided terminally of the objective lens and which are held in a cylindrical bore of the objective lens carrier, the connecting means being suitable for sliding the objective lens relative to the image sensor as well as pivoting it, and a method for the adjustment of a camera arrangement according to the invention.

20 Claims, 3 Drawing Sheets

U.S. PATENT DOCUMENTS

2009/0256931 A1* 10/2009 Lee et al. ............... 348/231.99

FOREIGN PATENT DOCUMENTS

| DE | 3304115 A1 | 2/1983 |
| DE | 43 39 397 C2 | 11/1993 |
| DE | 44 19 910 A1 | 12/1994 |
| DE | 198 00 281 A1 | 1/1998 |
| GB | 2 005 862 A | 4/1979 |
| JP | 61 088240 A | 5/1986 |
| JP | 10 027236 A | 1/1998 |
| JP | 2001 184449 A | 7/2001 |

OTHER PUBLICATIONS

Search Report for German application 103 59 193.1—Publication date Jul. 20, 2004.

* cited by examiner

CAMERA ARRAY AND METHOD FOR ADJUSTING A LENS WITH RESPECT TO THE IMAGE SENSOR

CROSS-REFERENCE TO RELATED APPLICATIONS

This application claims priority to international application PCT/EP2004/014285 filed Dec. 14, 2004 and German application DE 10359193 filed Dec. 17, 2003.

BACKGROUND OF THE INVENTION

1. Field of the Invention

The present invention concerns a camera arrangement for an automobile.

2. State of the Art

A camera arrangement of the above-mentioned kind is known from DE 101 15 043 A1. Here, a method and a device for calibrating a camera system are described, in particular a camera system mounted on a vehicle, with which calibration of the camera in a camera coordinate system in relation to a reference camera system is to be made possible in a simple manner.

Here, however, it is only a question of adjustment or alignment of the camera within the above-mentioned coordinate systems, in particular alignment with a predetermined point in space. Suitable adjustment of the objective lens to the image chip used in the camera, for example, in order to ensure the necessary homogeneous focus of the camera, is not proposed here.

The camera arrangements used in the field of vehicle technology must be set to an optimum focus at the factory. In the process, it must be taken into consideration that these are not cameras as used in the field of professional video recording, for example, but small cameras which are fitted with a small, usually two-dimensional image sensor and an objective lens, the objective lens being connected to the image sensor by a connecting means. To set the required focus, it is provided that the distance from the objective lens to the image sensor is varied until the image sensor delivers an image of sufficient focus. It must, however, be noted that, with the known camera arrangements, tilting of the image sensor (tilting of the image sensor to the printed circuit board plane which differs from the nominal value) must be expected. In this case, values of 2 degrees are fully within the permitted tolerance range. The consequence of this is, however, that, for example, with a focus range of about 0.05 mm on the image side, a focal length f=2 mm and with a stop number of 2.0, tilting the image sensor by 2 degrees leads to only part of the whole image sensor surface being capable of being brought into focus. The remainder or image section remains out of focus.

This is where the present invention comes in and makes it its object to provide a camera arrangement which, in spite of tilting of the image sensor, can be focused in the whole of the image region.

SUMMARY OF THE INVENTION

The camera arrangement of the present invention includes a printed circuit board, an image sensor, an objective lens and an objective lens carrier and a connection of the objective lens and its carrier.

According to the invention, the above objects are achieved by the fact that the connecting means is one or more ball segment-shaped housing sections which are provided terminally of the objective lens and which are held in a cylindrical bore of the objective lens carrier, the connecting means being suitable for sliding the objective lens relative to the image sensor as well as pivoting it. Due to this design of the connecting means, it is made possible for the objective lens to be optimally adapted to the position of the image sensor, i e. a homogeneous focus can be ensured over the whole image sensor region.

In an advantageous embodiment of the present invention, it is provided that the ball segment-shaped housing section and the cylindrical bore are mounted so as to be slidable and pivotable relative to each other by a loose fit. Due to this measure it can be ensured that there is a suitable connection between the ball segment-shaped housing section and the cylindrical bore. Due to this connection, in particular subsequent connection of the above-mentioned components, for example, by laser welding or gluing, is favoured. Furthermore, the objective lens can be fully guided by a suitable device during the adjustment process.

It is further advantageously provided that the objective lens, the printed circuit board with the image sensor and the objective lens carrier are accommodated in a housing. By this means a compact and robust construction of the camera arrangement can be ensured.

In an advantageous embodiment of the present invention it is provided that the ball segment-shaped section is injection-moulded integrally on the objective lens or glued to the objective lens. In addition to the one-piece construction of the above-mentioned components, it can be ensured that, for example, commercially available and cheap objective lenses can be fitted with a ball segment-shaped section according to the invention. Thus, for example, a material differing from the ball segment-shaped section can be used for the objective lens or the objective lens housing as well.

Furthermore it may be advantageously provided that the objective lens carrier is made of a material which is permeable to laser radiation. This favours a connection process between the objective lens carrier and the objective lens at the end of the adjustment process by the fact that a laser beam melts only the material of the objective lens or of the ball segment-shaped section in order to make a connection with the objective lens carrier.

A further object of the present invention lies in proposing a method for the adjustment of a camera arrangement according to the invention, where it is to be ensured that a sharp image is delivered over the whole of the image sensor region.

According to the invention this object is achieved by a method with the steps of claim 6. The method includes introducing the objective lens into the objective lens carrier in a predetermined initial position $W_1$, reading out the image sensor information and determining the contrast values in predetermined image regions, determining a weighted average of the contrast values and storing the weighted average linked with the respective distance position $W_n$ in an evaluating device, sliding the objective lens by a distance section $\Delta z$ in the direction of the image sensor, repeating the last steps until the ball segment-shaped housing section reaches a predetermined end position $W_{end}$, sliding the objective lens into the distance position $W_{max}$ in which the value of the stored weighted averages is maximal, pivoting the objective lens into a predetermined first initial pivot position $S_{\alpha 1}$, reading out the image sensor information and determining the contrast values in predetermined image regions, determining a weighted average of the contrast values and storing the weighted average linked with the respective pivot position $S_{\alpha n}$ in a suitable evaluating device, pivoting the objective lens by a pivot angle $\Delta \alpha$ in a predetermined first pivot direction $\alpha$, repeating the last steps until a predetermined first end position $S_{\alpha end}$ is reached, pivoting the objective lens into the pivot position $S_{\alpha max}$ in which the value of the stored weighted averages is maximal, and connecting the ball segment-shaped housing section to the cylindrical bore. This method insures that the objective lens projects an image on the image sensor uniformly, i.e. the optical axis of the objective lens corresponds to the central normal vector of the image sensor, and a uniformly sharp image can be expected. Tilting of the image sensor can thus be compensated.

In an advantageous further development of the method according to the invention, before connection of the cylindrical bore to the ball segment-shaped housing section, the following steps which enable even more precise adjustment of the objective lens are provided. By pivoting the objective lens in a pivot direction b orthogonal to the pivot direction α into a second initial pivot position $S_{\beta 1}$, reading out the image sensor information and determining the contrast values in predetermined image regions, determining a weighted average of the contrast values and storing the weighted average linked with the respective pivot position $S_{\beta n}$ in a suitable evaluating device, pivoting the objective lens by a pivot angle Δβ in the direction opposite the second pivot direction b, repeating the last steps until a predetermined second end position $S_{\beta end}$ is reached, pivoting the objective lens into the pivot position $S_{\beta max}$ in which the value of the pre-stored weighted averages is maximal, even more precise adaptation of the objective lens to a tilt of the image sensor can be performed.

In a further advantageous embodiment of the method according to the invention, it may be provided that the image sensor information to be read out is the picture elements which lie on a radius $R=\frac{1}{4}*$ the width of the image about the image centre to be expected. This group of picture elements is particularly suitable inter alia for forming a representative average of the contrast values.

It may further advantageously be provided that the contrast values are determined by the modulation transfer function.

Advantageously it may be provided that the ball segment-shaped housing section and the cylindrical bore are connected to each other by laser welding or gluing. These methods have proved to be particularly economical and easy-to-handle methods for joining the above-mentioned components. However, other connecting mechanisms remain conceivable too, for example, screwing.

It may further advantageously be provided that the measured contrast values are contrast values independent of each other for the colour values red, green and blue. This creates the possibility of performing an adjustment according to the perception of the human eye and further improving the picture quality of the camera arrangement.

In a particularly advantageous embodiment of the present invention it may be provided that the colour values are weighted with a factor, the green contrast values being more heavily weighted than the red contrast values and the red contrast values more heavily than the blue contrast values. With this system of adjustment, the camera arrangement is particularly well adapted to the perception of the human eye.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further characteristics and advantages of the present invention become clear with the aid of the following description of preferred embodiments with reference to the attached drawings. These show FIG. 1 a camera arrangement according to the invention in a partly sectioned perspective view.

DETAILED DESCRIPTION OF THE PREFERRED EMBODIMENTS

The following description of the preferred embodiment(s) is merely exemplary in nature and is in no way intended to limit the invention, its application, or uses.

Figure 1:
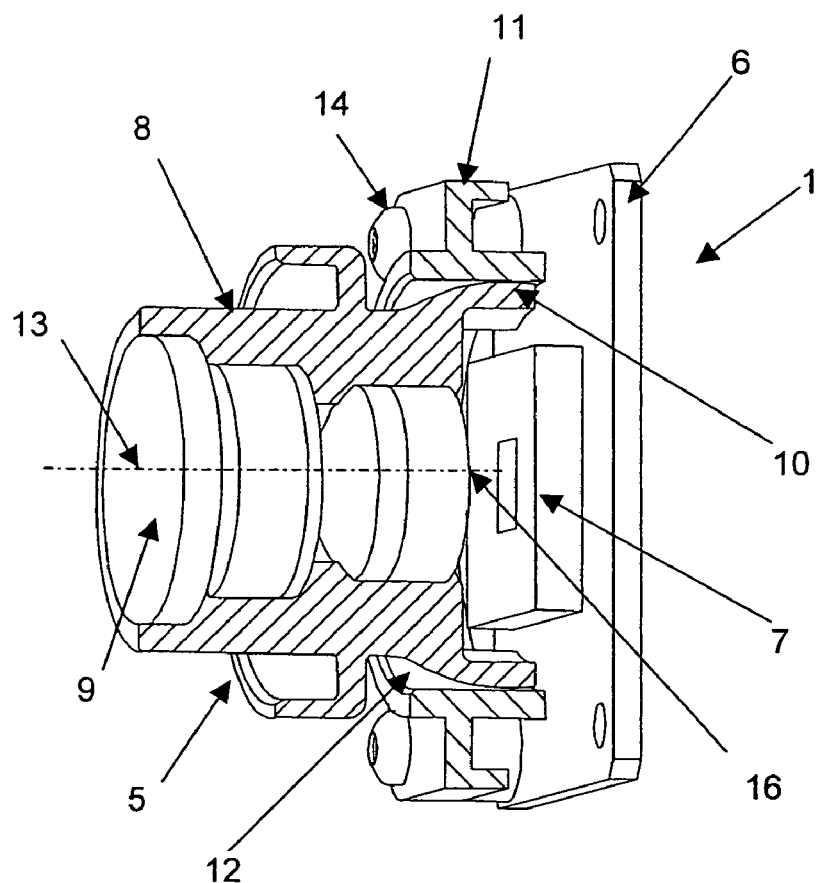
Figure 2:
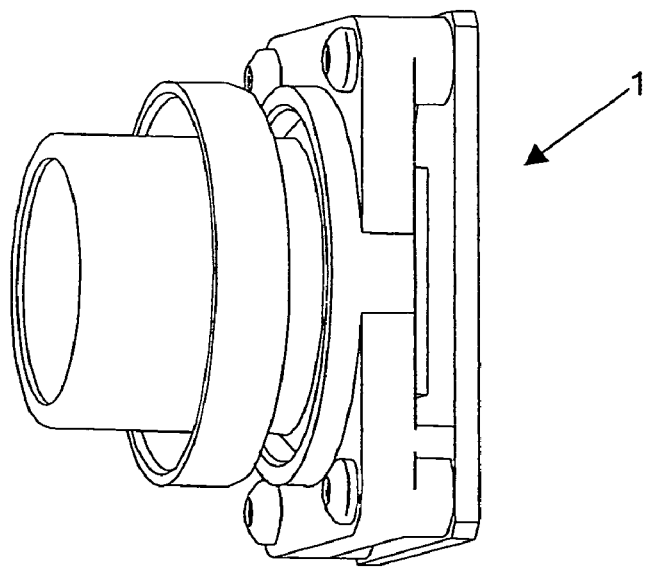
FIG. 2 a camera arrangement according to the invention in a perspective view.
Figure 3:
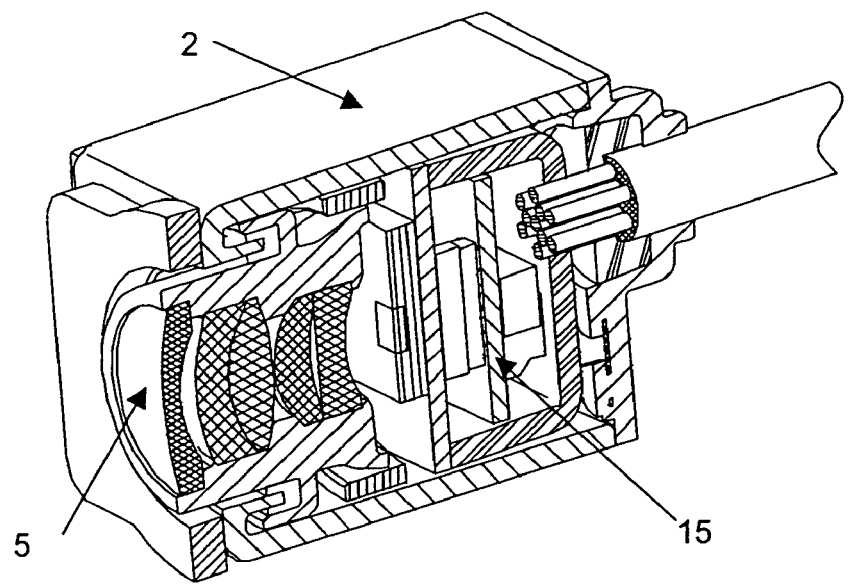
FIG. 3 a sectioned view of a camera arrangement according to the invention in a housing.
Figure 4:
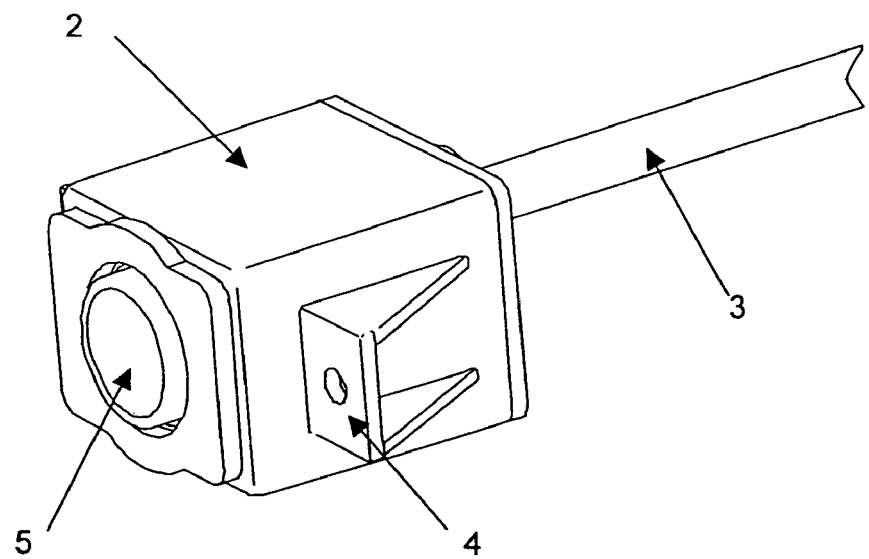
FIG. 4 a camera arrangement according to the invention in a housing.
Figure 5:
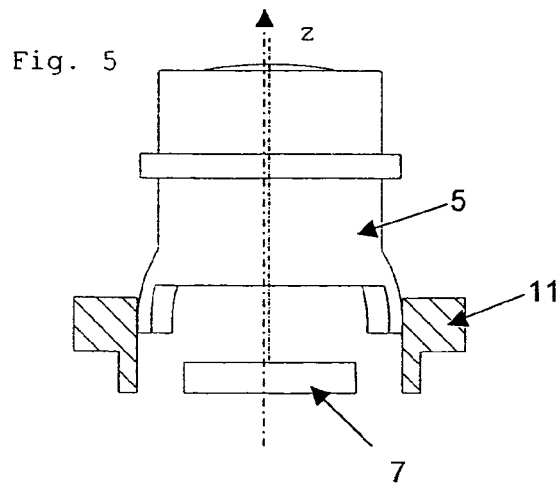
FIGS. 5 to 10 a schematic view of individual steps of the method according to the invention for the adjustment of a camera arrangement according to the invention.
Figure 8:
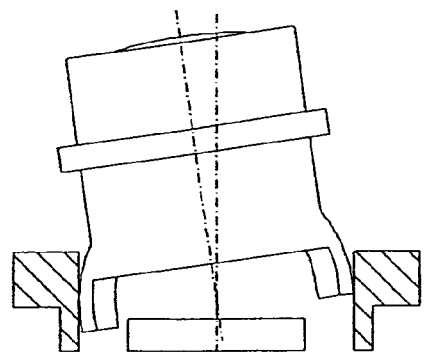
Figure 6:
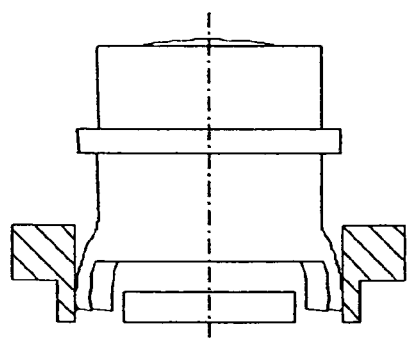
Figure 9:
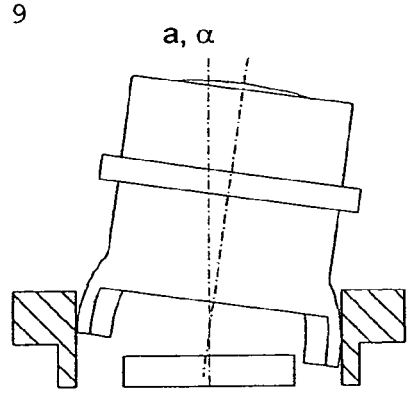
Figure 7:
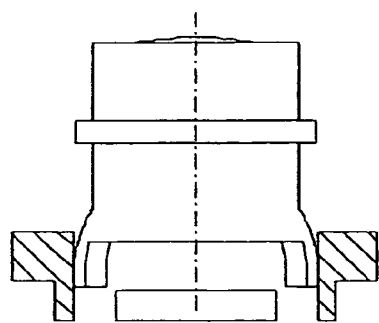
Figure 10:
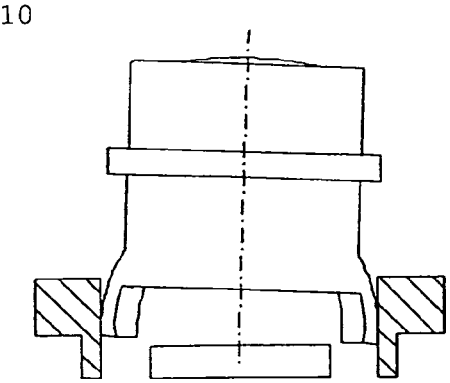

First, reference is made to FIG. 1. A camera arrangement 1 according to the invention essentially includes a printed circuit board 6, on which a two-dimensional image sensor 7 with a sensitive surface is mounted approximately centrally. In front of the image sensor 7 is mounted an objective lens 5 which ideally projects a sharp image over the whole sensitive surface of the image sensor 7. This case arises when the following conditions are fulfilled.

The objective lens 5 includes an essentially cylindrical objective lens housing 8 in which in each case suitable lenses 9 are arranged in a row along an optical axis 13. The optical axis 13 in this preferred embodiment, as it is a question of rotationally symmetrical lenses 9, passes through the lens centres. A sharp image over the whole image sensor surface arises when the objective lens 5 adopts the correct distance from the image sensor 7, and when the optical axis 13 falls perpendicularly on the centre of the image sensor 7, in other words, when a normal vector 16 arranged centrally of the image sensor 7 coincides with the optical axis 13. In order to be able to create this state, according to the invention a connecting means is provided between objective lens 5 and printed circuit board 6, which is designed as described below.

The objective lens 5 is fastened to an objective lens carrier 11 on the printed circuit board 6. The objective lens carrier 11 itself is mounted by screws 14 on the printed circuit board 6 and comprises a centrally arranged cylindrical bore 12. The objective lens carrier 11 can be made of a material which is permeable to laser radiation. The objective lens housing 8 in turn is terminally fitted with a ball segment-shaped housing section 10 which can be introduced into the cylindrical bore 12, the edges of the ball segment-shaped housing section 10 abutting against the cylindrical bore 12 within the framework of a loose fit, i.e. a slight clearance is provided between the ball segment-shaped housing section 10 and the cylindrical bore 12, so that sliding of the objective lens 5 along the cylindrical bore 12, as well as pivoting of the objective lens 5 to a desired angle between the normal vector 16 and the optical axis 13, become possible.

The objective lens 5 can be, for example, a commercially available objective lens which is basically obtainable in large numbers. In a special operation the objective lens 5 or the objective lens housing 8 is made with the corresponding ball segment-shaped housing section 10, for example, by injection-moulding it on or adhesion. Plastic is possible as the material for the ball segment-shaped housing section 10, for example, while the objective lens 5 can be made of metal. Also the objective lens 5 together with the ball segment-shaped housing section 10 can be made in one piece.

Furthermore the above-mentioned components are accommodated in a compact housing 2 in which furthermore a printed circuit board 15 for the camera electronics can be integrated. Out of the housing 2 extends a connecting wire 3, and fastening elements 4 which allow installation of the camera arrangement 1 in a motor vehicle are provided.

In the adjustment process of the camera arrangement 1, the objective lens 5 is mounted in the objective lens carrier 11 and slid in the direction of the optical axis 13, called the Z axis below, out of an initial position $W_1$ until regions of the image sensor 7 are brought into focus. For reasons of manufacture and measurement technology, the optimum position of the depth of focus cannot be determined directly. Therefore to determine the position of the objective lens 5 the camera arrangement 1 is aligned with a test image and then the image of the image sensor 7 or the image of the camera arrangement 1 is read out and analysed with analysis software in an evaluating device (for example, a personal computer). For determining the imaging quality of the objective lens 5, the MTF (modulation transfer function, contrast) is determined in some image regions with the evaluating device. After evaluation of the camera image the objective lens 5 is slid along the optical axis 13 from the initial position $W_1$ by a distance $\Delta z$ into a further distance position $W_n$, and the imaging quality is determined again. The operation is repeated until the objective lens 5 has passed through the optimum position and the end position $W_{end}$ is reached. Essentially the initial position $W_1$ is a position in which the ball segment-shaped housing section 10 abuts against the upper edge of the cylindrical bore 12, and the end position $W_{end}$ is the position in which the ball segment-shaped housing section 10 abuts against the lower end of the cylindrical bore 12. Basically, from experience it is not necessary to move into the extreme positions described above. They serve only as orientation positions for illustrating the method according to the invention. Also, basically it is possible to move the objective lens from the lower end to the upper end of the cylindrical bore 12.

On the basis of the measured contrast values of the distance positions $W_n$, from this is calculated a weighted average which is linked with the respective distance position. Weighting comes about by multiplying each contrast value as a function of its image position by a predetermined weighting factor. Due to weighting, preferred picture elements can be more involved in the weighted average to be determined at any given time.

Accordingly, the objective lens is moved back into the distance position $W_{max}$ with the highest (best) weighted average. It is also conceivable that a position $W_{max}$ which lies between the previously approached distance positions $W_n$ is approached if, for example, an interpolation method was applied to the weighted averages.

To put it another way, the position is to be the optimum position in which the average contrast at predetermined image positions is maximal or in which the standard deviation from the maximum contrast value is minimal. Thus the Z position of the objective lens 5 is fixed.

It should be noted that the locations in the image which lie on the radius R about the image centre to be expected, for which R=¼* width of the image holds true, are used to determine the contrast. Furthermore it is advantageous also to use the image centre and the image edges for contrast determination.

Next the objective lens 5 is rotated about the pivot point of the ball segment-shaped housing section 10 until the optical axis 13 of the objective lens 5 and the normal vector 16 of the image sensor 7 coincide, i.e. the objective lens 5 is adjusted about one or two tilt axes orthogonal to each other ($\alpha$, $\beta$ axis) (as a function of the depth of focus on the image side).

For this purpose, first of all an initial pivot position $S_{\alpha 1}$ is approached and the weighted average of the contrast values is determined similarly to the method listed above, assigned to the respective pivot position and temporarily stored in the evaluating device.

Then the objective lens 5 is pivoted by an amount $\Delta\alpha$ in a predetermined pivot direction a and the contrast values are read out again, and the weighted average is formed, assigned to the respective pivot position and stored temporarily.

Finally the objective lens 5 is moved back into the pivot position $S_{\alpha max}$ in which the weighted average of the contrast values is maximal, or in which the standard deviation (error) from the maximum contrast becomes minimal.

From experience the objective lens 5 can be sufficiently oriented with the steps described above in such a way that the optical axis 13 of the objective lens 5 mainly coincides with the central normal vector 16 of the image sensor 7.

For further optimisation it may be provided that the objective lens 5 is pivoted about a pivot direction b orthogonal to the pivot direction $\alpha$, and in the process the same steps as for the pivot direction $\alpha$ are repeated.

In a further advantageous assembly step the position of the objective lens 5 can be varied again about the Z axis, and the location with the maximum contrast can be found at predetermined positions in the image.

In the position adjusted in this way, the objective lens 5 is laser-welded to the objective lens carrier 11.

If the camera arrangement is a colour camera system, at each step three contrast values independent of each other for red, green and blue are determined. According to the perception of the human eye, primarily the green contrast values are more heavily weighted than the red ones and more heavily than the blue contrast values.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

The invention claimed is:

1. A camera arrangement, in particular for use in a motor vehicle, comprising
   a printed circuit board with an image sensor and an objective lens carrier; and
   an objective lens for projecting an image onto the image sensor;
   the objective lens being connected by a connector to the objective lens carrier;
   said connector being one or more ball segment-shaped housing sections, said sections being operatively engaged with said objective lens and said sections being held in a cylindrical bore of said objective lens carrier, said connector being operative to slide said objective lens relative to said image sensor; and said connector being operative to pivot said objective lens relative to said image sensor.

2. The camera arrangement according to claim 1, wherein the ball segment-shaped housing section is mounted in the cylindrical bore with a clearance sufficient to be slidable and pivotable relative to said cylindrical bore.

3. The camera arrangement according to claim 1, wherein the objective lens, the printed circuit board with the image sensor and the objective lens carrier are accommodated in a housing.

4. The camera arrangement according to claim 1, wherein the ball segment-shaped section is injection molded integrally on the objective lens or glued to the objective lens.

5. The camera arrangement according to claim 1, wherein the objective lens carrier is made of a material which is permeable to laser radiation.

6. The camera arrangement of claim 1 further comprising a controller, said controller being configured to:
   introduce an objective lens into the objective lens carrier in a predetermined initial position;
   read out information from an image sensor and determine a contrast value in a predetermined image region, determine a first weighted average of contrast values and store the weighted average linked with a respective distance position in an evaluating device;
   slide the objective lens by a distance section in the direction of the image sensor;
   repeat said determination of said first weighted average and said slide until the ball segment-shaped housing section reaches a predetermined end position;
   slide the objective lens into the distance position Wmax where the value of the stored weighted averages is maximal;
   pivot the objective lens into a predetermined first initial pivot position;
   read out the image sensor information and to determine the contrast values in the predetermined image regions, to determine a second weighted average of the contrast values and to store the second weighted average linked with the respective pivot position in an evaluating device;
   pivot the objective lens by a pivot angle in a predetermined first pivot direction;
   repeat said determination of said second weighted average and said pivot until a predetermined first end position is reached;
   pivot the objective lens into the pivot position Sαmax in which the value of the stored second weighted averages is maximal.

7. A camera arrangement comprising:
   an objective lens in objective lens carrier in a predetermined initial position;
   a controller configured to read information from an image sensor and to determine a contrast value in a predetermined image region, and to determine a first weighted average of contrast values and to store the weighted average linked with a respective distance position in an evaluating device;
   said objective lens being slidable in the direction of the image sensor in response to a signal from said controller;
   said controller being further configured to repeat said determining a first weighted average step and to slide said objective lens until a housing section reaches a predetermined sliding end position;
   said controller being further configured to slide said objective lens to a distance position $W_{max}$ in which the value of the stored weighted averages is maximal;
   said objective lens being pivotable into a predetermined first initial pivot position;
   said controller being further configured to read out the image sensor information and determine the contrast values in the predetermined image regions, and to determine a second weighted average of the contrast values and to store the second weighted average linked with a respective pivot position in an evaluating device;
   said controller being further configured to pivot said objective lens by a pivot angle in a predetermined first pivot direction;
   said controller being further configured to repeat said determining a second weighted average step and said pivoting step until a predetermined pivoting end position is reached;
   said controller being further configured to pivot said objective lens into a pivot position $S_{\alpha max}$ in which the value of the stored second weighted averages is maximal;
   said housing section being operatively engaged with the cylindrical bore.

8. The camera arrangement according to claim 7, further comprising:
   said objective lens being pivotal in a second pivot direction orthogonal to the first pivot direction into a second initial pivot position;
   said controller being further configured to read out the image sensor information and determining a contrast value in predetermined image regions, and to determine a third weighted average of the contrast values and to store the weighted average linked with a second respective pivot position in the evaluating device;
   said objective lens being pivotable by a second pivot angle in the direction opposite the second pivot direction;
   said controller being configured to repeat said determining a third weighted average step and said pivoting step until a predetermined second pivot end position $S_{\beta end}$ is reached;
   said objective lens being pivotable into a pivot position $S_{\beta max}$ in which the value of the pre-stored weighted averages is maximal.

9. The camera arrangement according to claim 7, wherein the predetermined image regions are at least the picture elements which lie on a radius R=¼* the width of an image about an expected image center.

10. The camera arrangement according to claim 7, wherein the contrast values are determined by a modulation transfer function.

11. The camera arrangement according to claim 7, wherein the housing section and the cylindrical bore are connected to each other by laser welding or gluing.

12. a camera arrangement according to claim 7, wherein the measured contrast values are contrast values independent of each other for the color values red, green and blue.

13. The camera arrangement according to claim 7, wherein the color values are weighted with a factor, the green contrast values being more heavily weighted than the red contrast values and the red contrast values more heavily than the blue contrast values.

14. The camera arrangement of claim 7 wherein said housing section is ball segment shaped.

15. A camera meeting image tolerance criteria by adjustment after manufacture and initial assembly of components comprising:
   a housing;

a planar image sensor being fixedly mounted on said housing;

a lens mounted in a lens holder, said lens defining a focal plane;

said lens holder being initially slideable relative to said housing along an axis substantially normal to said planar image sensor such as to enable selectively varying an axial position of said focal plane relative to said image sensor;

said lens holder being initially pivotable relative to said housing such as to enable selectively varying an angle of said focal plane relative to said planar image sensor;

said lens holder being fixedly adhered to said housing in a user selected position relative to said image sensor;

said user selected position being determined according to preconfigured image control criteria and according to maximal values for said image control criteria obtainable before said fixed adherence of said lens holder to said housing by adjusting said sliding and said pivoting of said lens holder relative to said housing.

16. The camera of claim 15 wherein said criteria are a weighted average of contrast values measured at predetermined image positions.

17. The camera of claim 15 wherein said criteria are an interpolation of weighted averages of contrast values from various image positions.

18. The camera of claim 15 wherein said criteria are a predetermined standard deviation threshold from a maximum contrast value.

19. The camera of claim 15 wherein said criteria are determined according to values measured within the predetermined radius of an image center.

20. The camera of claim 15 wherein said maximum values are interiatively calculated to obtain the maximal value.

* * * * *